Dec. 1, 1953     P. M. SCHMITT     2,660,861
VARIABLE SPEED AND DIRECTION POWER UNIT
Filed Feb. 14, 1952     2 Sheets-Sheet 1

INVENTOR
PAGE MARSTON SCHMITT.
BY
ATTORNEY

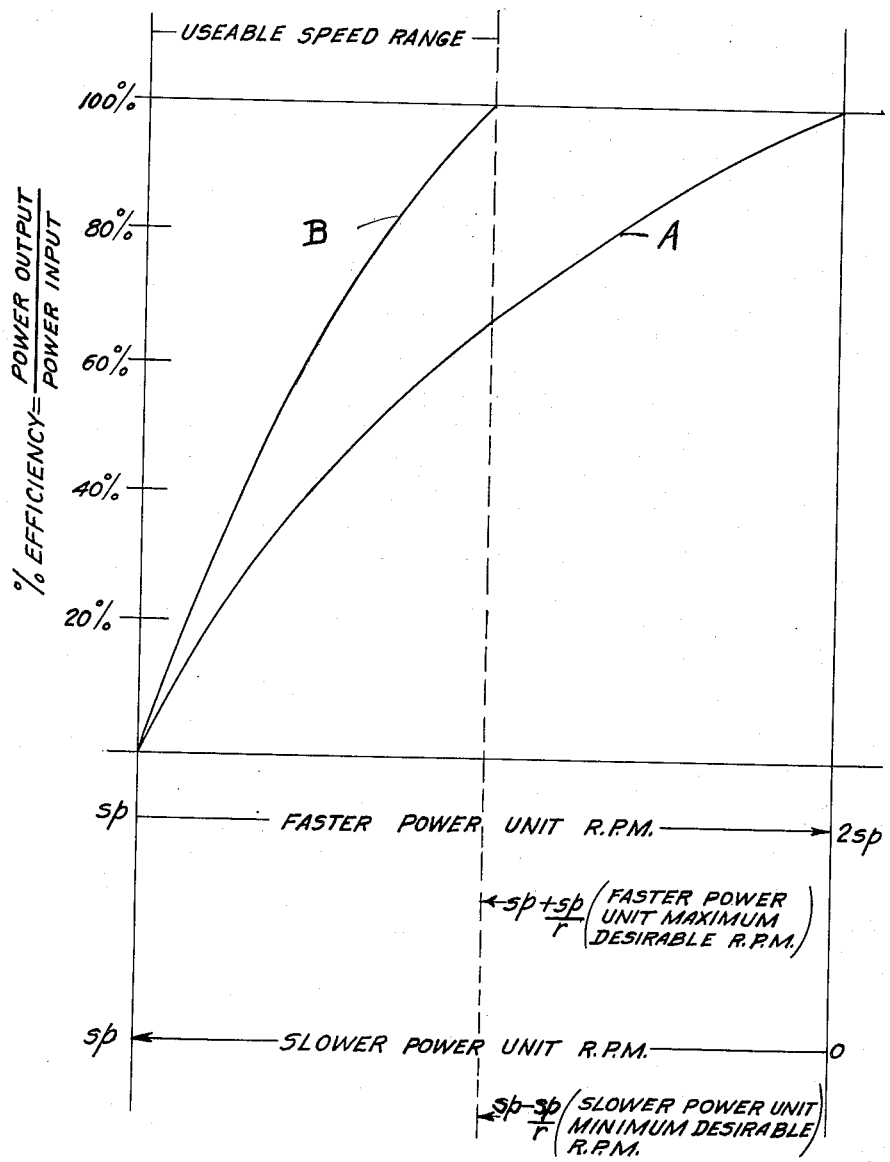

Patented Dec. 1, 1953

2,660,861

UNITED STATES PATENT OFFICE 2,660,861

VARIABLE SPEED AND DIRECTION POWER UNIT

Page Marston Schmitt, Bethesda, Md., assignor to Taub Engineering Company, Washington, D. C., a corporation of Delaware Application February 14, 1952, Serial No. 271,542

9 Claims. (Cl. 60—97)

The invention relates to a variable speed and direction power-pack, and more particularly to a mechanical combination of power units and gearing to provide a selectively reversible power output shaft of infinitely variable speed and also a constant speed power output shaft.

More especially, this invention relates to an improvement in the power-pack described in the copending Taub application, Serial No. 162,062, filed May 15, 1950. The power-pack disclosed therein comprises twin power units driving the opposite gears of a differential gear unit in opposite directions for power takeoff from the orbital gear. Hence, when the power units are running at the same speed, the speed of the differential unit orbital gear is zero. A difference in speed between the two power units, however, revolves the orbital gear at a speed proportional to the difference in speed between the two power units and in a direction dependent upon which power unit is running faster. Hence, by the use of a compensator speed regulator for the twin power units for varying their speed equally and oppositely from a predetermined equal speed, the speed of the readily reversible power output shaft may be varied with great precision.

A differential gear unit, however, acts as a torque balancing device so that the greater torque of the faster power unit tends to speed up the slower power unit above its correct compensated speed. Additionally, no torque output can be had from a differential driven in this manner without reaction torque on the slower side. Some reaction will be provided by the dragging torque of the idling power unit (its friction horsepower). For the faster power unit to deliver a greater torque than this "dragging torque," in order to hold down the speed of the slower power unit and also to provide the necessary reaction torque, each power unit is provided with a compensator-controlled torque absorber, which may be a friction brake, a generator, a hydraulic pump, or other suitable adjustable loading device. When a particular power unit is operating at or above the predetermined equal speed of both power units, its torque absorber provides no load. However, when a power unit slows below the predetermined speed, its torque absorber is automatically adjusted by the speed compensator to apply a load that is substantially proportional to the load upon the output shaft, less the dragging torque of the slow power unit. Stated in other words, the torque absorber of the slower power unit applies a load which is proportional to the speed reduction of the slower power unit below the predetermined equal speed. Thus, the torque tending to speed up the slower power unit is counteracted by the reaction torque of its torque absorber so that both power units run at their desired compensated speeds.

The necessity of such torque absorbers for accomplishing accurate control of the speed of the power-pack output shaft, inherently lessens the efficiency of the power-pack because of the power losses in the torque absorbers.

In addition to the torque absorbers, the power-pack disclosed in the aforementioned copending application is provided with additional means for providing fast accurate response of the power-pack output shaft to changes in speed of the twin power units. This means consists of a second differential gear unit having its opposite gears connected to the power units for drive in the same direction. Hence, the orbital gears of the second differential will revolve at a constant speed proportional to the sum of the speeds of the two power units. Driven by the orbital gear is a rotary inertia device, such as a flywheel or a generator. This inertia device, rotating at a constant speed, acts as a torque fulcrum to provide temporary torque reaction so that even without the torque absorbers, an increase in speed of one power unit tends to reduce the speed of the other proportionately.

The above described power-pack, while eminently satisfactory for its intended purpose, is subject to the disadvantage of lowered efficiency because of the torque absorbers.

Hence, it is an object of this invention to increase the efficiency of a power-pack of the type described.

It is another object of this invention to regeneratively utilize a part of the power absorbed in the torque absorbers of a power-pack of the type described.

It is a further object of this invention to provide a power-pack of the type described, in which the reaction torque of the torque absorbers is regeneratively added to the output torque of the power-pack output shaft to thereby increase the efficiency of the power-pack.

Other objects and advantages of the invention will be apparent from the following description and accompanying drawings, in which:

Figure 2 is an efficiency chart for a power-pack of the type described and contrasting the efficiencies of such pack with and without this invention.

Figure 1:
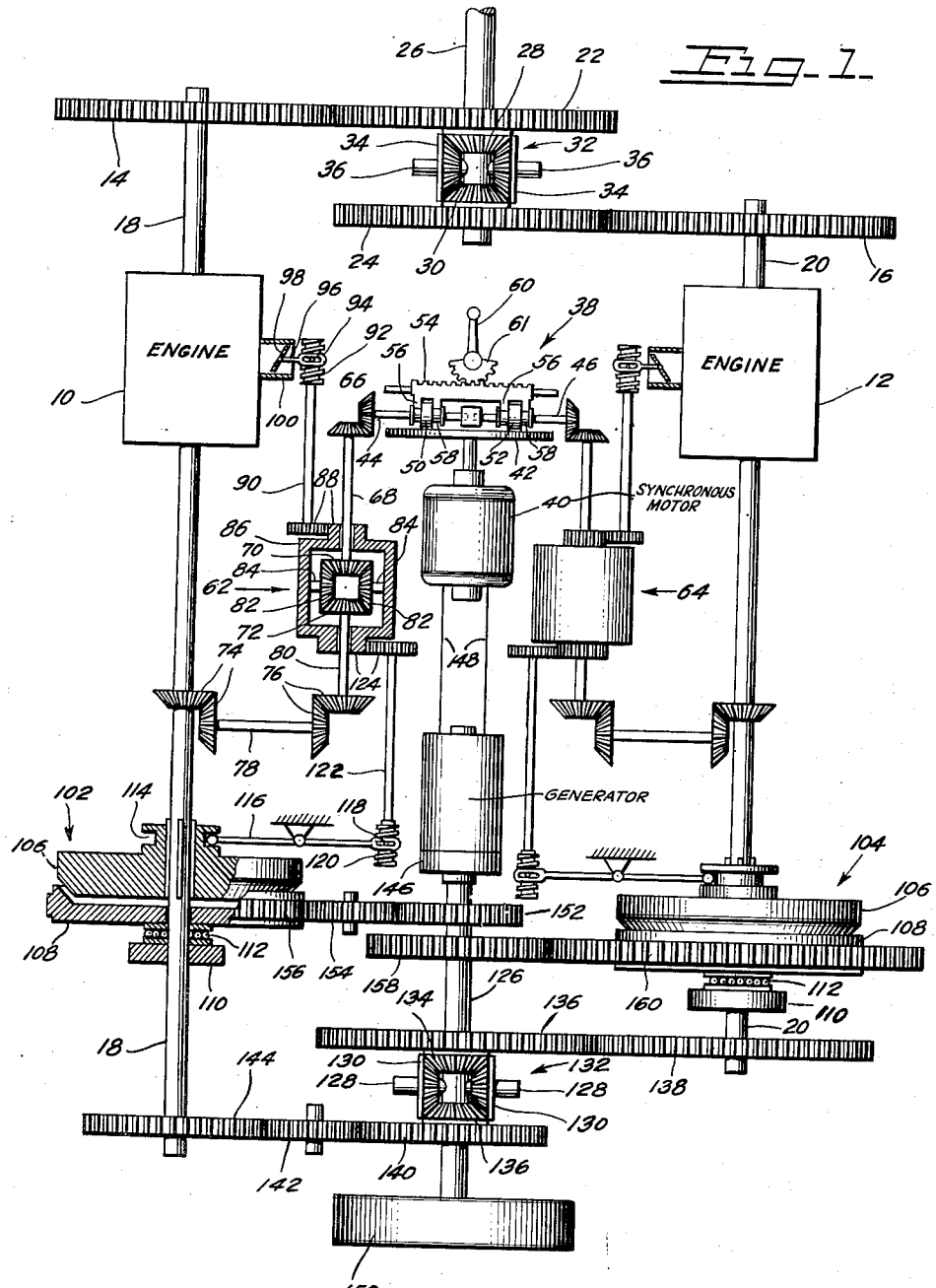
Figure 1 is a schematic showing of a power-pack embodying this invention.

Referring now to the drawings, there is shown in Figure 1 a power-pack having twin internal combustion engines 10 and 12 rotating in opposite directions. Gears 14 and 16 on the output shafts 18 and 20, respectively, of the engines, mesh with and drive in a 1-to-1 ratio corresponding gears 22 and 24 that are rotatably mounted on a power-pack output shaft 26. Concentrically secured to the opposed faces of the gears 22 and 24 are the opposite bevel gears 28 and 30, respectively, of a differential gear unit 32, having the pinion gears 34 thereof mounted on stub shafts 36 secured radially on the power-pack output shaft 26.

Hence, when the engines 10 and 12 are rotating at the same speed, the bevel gears 28 and 30 rotate at the same speed, but in opposite directions, so that the pinion gears 34 do not revolve about the axis of the bevel gears. When the engines 10 and 12 run at different speeds, however, the pinion gears 34 revolve and so rotate the power-pack output shaft 26 at a speed proportional to the difference in speed between the two engines. With the 1-to-1 driving ratio shown, the speed of the power-pack output shaft 26 is one half of the speed difference between the engines, since the torque of the output shaft 26 must equal the sum of the torques of the bevel gears 28 and 30 with a corresponding reduction in speed of such shaft to one half of the difference in speed between the bevel gears.

To simultaneously change the speed of the engines 10 and 12 equally and oppositely from a predetermined equal speed, a compensating speed control, indicated generally at 38, is provided. The particular arrangement here shown is for illustrative purposes only. In general, there can be used any servo type control able to vary the power unit speed control, and the associated torque absorber control, to maintain the relative power unit speeds needed for a certain output speed. In the embodiment illustrated, this control has a constant speed synchronous electric motor 40, powered by a source of electrical energy later described, rotating a flat disc 42. Splined to axially aligned rotatable shafts 44 and 46, disposed diametrically of the disc 42 are a pair of rollers, 50 and 52 respectively, that bear against the face of the disc on diametrically opposite sides of its axis. Hence, rotation of the disc 42 drives the shafts 44 and 46 in opposite directions. A rack 54 is mounted for longitudinal slidable movement parallel to the shafts 44 and 46. Projecting from the rack 54 are two spaced pairs of ears 56, the ears of each pair straddling a corresponding roller 50 or 52 and closely fitting into circumferential grooves 58 formed in reduced portions of the rollers on opposite sides of their disc-engaging surfaces. Hence, longitudinal movement of the rack 54, by an operating handle 60 of a pivoted segmental control gear 61, shifts the rollers 50 and 52 equal distances axially along their driven shafts 44 and 46. When the rollers are equally spaced from the axis or center of the disc 42, the speeds of the shafts 44 and 46 are equal, but axial shifting of the rollers by the rack 54 will change the shaft speeds equally and oppositely and by an amount proportionate to the movement of the rack.

Each of the two shafts 44 and 46 drives a bevel gear of a separate differential gear unit 62 and 64. Since the operation of each of these differential gear units 62 and 64 is identical, a description of the unit 62 will suffice. The shaft 44, through appropriate gears 66 and a shaft 68, drives the bevel gear 70 of the differential unit 62. The other bevel gear 72 of the unit 62 is driven in an opposite direction by the power output shaft 18 of the engine 10, by an appropriate drive train of gears 74 and 76, and shafts 78 and 80. The drives for the two bevel gears 70 and 72 are arranged so that they are driven at equal speeds in opposite directions when the control handle 60 is in "neutral" position, i. e., the rollers 50 and 52 are equidistant from the axis of the disc 42. The pinion gears 82 of the differential unit 62 are mounted on stub shafts 84 secured to the interior of a rotatable housing 86 journalled on the shafts 68 and 80. Hence, the housing 86 is stationary when the bevel gears 70 and 72 are rotating at the same speed, but a difference in speed between the latter causes the housing 86 to rotate.

Such rotational movements of the housing 86 are used to control the speed of the engine 10, as by a suitable connection, such as the meshing gears 88, one of which is secured to the housing 86, shaft 90, worm 92, follower 94 and lever 96, with the butterfly valve 98 in the intake manifold 100 of the engine. Thus, for example, when the control handle 60 is rotated clockwise from a neutral position, the rack 54 moves to the left, thus speeding up the bevel gear 70 relative to the gear 72 of the differential unit 62. The resulting orbital movement of the pinion gears 82 rotates the housing 86 in a direction to cause the butterfly valve 98 to open more, thus effecting an increase in speed of the engine 10. Such speed increase increases the gear 72 relative to the gear 72 of the differential unit 62, so that when the speed of the gear 72 equals that of the gear 70, further rotation of the housing 86 ceases and the butterfly valve 98 is brought to rest in a position corresponding to that of the control handle 60. Likewise, movement of the control handle 60 in a counterclockwise direction, decreases the speed of the engine 10.

The speed of the engine 12 is controlled through the differential gear unit 64 by an associated system of shafts, gearing, and levers identical with those described for controlling the speed of engine 10. The control handle 60, however, effects equal and opposite control of the speeds of the two engines 10 and 12, so that when one is slowed down, the other is speeded up a proportionate amount. When the control handle 60 is in "neutral," both engines run at a predetermined equal speed, for example, one half of their maximum speed, and the power-pack output shaft 26 is stationary. Movement of the control handle 60 out of neutral position, however, causes the shaft 26 to turn in a direction dependent upon whether the control handle 60 is right or left of its neutral position and at a speed proportionate to the extent of movement of the control handle from its neutral position. Hence, the speed of the power-pack output shaft is infinitely variable. The predetermined equal speed of both engines is pre-set into the compensator speed control 38 but may be changed, governor controlled, by varying the speed of the electric motor 40 or varying the spacing between the rollers 50 and 52 by an extensible rack.

Since a differential gear unit is essentially a torque balancing device, the greater torque of the faster of the two engines 10 and 12 acting through the differential unit 32, tends to speed up the slower of the two engines, i. e. increase its speed above the speed thereof effected by the compensating speed control 38. In order to counteract this tendency and to maintain the speed of the slower engine at the correct compensated value, each engine drives a torque absorber which may be a loadable hydraulic pump, a loadable electric generator, an adjustable friction brake, or other appropriate means for absorbing or counteracting the speed accelerating torque imparted to the slower engine through the differential unit 32. For illustrative purposes, such torque absorbers are herein shown as friction brake units 102 and 104, operative respectively on the power output shafts 18 and 20 of the engines 10 and 12.

Each brake unit has a brake drum 106 splined to the corresponding engine output shaft and movable axially into frictional engagement with a brake reaction disc 108 rotatably mounted (for reasons later explained) on the output shaft against a thrust collar 110. An anti-friction thrust bearing assembly 112 is interposed between the brake disc 108 and the thrust collar 110 of each brake unit. Since both brake units 102 and 104 are controlled in an identical manner by the compensating speed control 38, a description of the control mechanism for the brake unit 102 will suffice for both.

The brake drum 106 of the unit 102 has a circumferential groove 114 in a reduced portion thereof. One end of a pivoted lever 116 rides in the groove 114 while the other end of the lever has a follower 118 riding in a worm 120 on a rotatable shaft 122. Hence, rotation of the shaft 122 in one direction will force the brake drum 106 against the reaction disc 108 to apply a braking force to the engine shaft 18. Meshing gears 124, one of which is fixed to the housing 86 of the differential gear unit 62, effect rotation of the shaft 122 to apply or release the brake unit 102 in accordance with the direction of rotation of the housing 86. This control mechanism for the brake unit 102 is so arranged that when the speed of the engine 10 is at the corresponding speed of shaft 68, the brake unit 102 is not further applied. When, however, the speed of the engine 10 is above the corresponding speed of shaft 68, determined by operation of the control handle 60, the consequent rotational movements of the housing 86 of the differential unit 62 act to apply the brake unit 102 to a degree substantially proportionate to the speed of the engine 10 above the corresponding speed of shaft 68. In other words, the braking force applied to the engine 10, i. e. torque absorption, is respectively increased or decreased substantially in proportion to its speed error above or below the correct speed determined by the compensator. Since the brake unit 104 is controlled by an identical mechanism connected to the differential gear unit 64, the greater torque of the faster engine will not speed up the slower above its correct compensated speed, because the greater torque is counteracted and balanced by the reaction torque of the slower engine and the reaction torque of the torque absorber. Hence, the speed of the power-pack output shaft 26 is correctly governed by the control handle 60 of the compensating speed control 38.

The linkages for operating the throttle and brake are so coordinated that the brake begins to be applied as the throttle approaches the closed position; further a spring or lost motion connection (not shown) is provided in the throttle linkage, in order to absorb or eliminate forces acting on this linkage during the continued movement of the brake linkage with the throttle closed.

The governing effect of the torque of the torque absorbers 102 and 104 is supplemented by the action of a constant speed shaft 126, having radial stub shafts 128 mounting the revolving pinion gears 130 of a differential gear unit 132, the bevel gears 134 and 136 of which are rotatably mounted on the shaft 126. One bevel gear 134 of the unit 132 has a gear 136 concentrically secured thereto, and driven in a 1-to-1 ratio by a gear 138 fixed on the power output shaft 20 of the engine 12. The other bevel gear 136 of the differential unit 132 has a gear 140 concentrically secured thereto, driven in the same direction as the gear 136 by an idler gear 142 meshing with a gear 144 mounted on the power output shaft 18 of the engine 10. The gears 140 and 144 are of equal diameter so that the gear 144 drives the gear 140 in a 1-to-1 ratio.

Since the bevel gears 134 and 136 of the differential gear unit 132 are driven in the same direction and at the same speed as the power output shafts 20 and 18, respectively, the shaft 126 is rotated by the revolving orbital gears 130 at a speed proportional to the sum of the speeds of the engines 10 and 12, which sum is constant because of the action of the compensating speed control 38. Therefore, for the driving ratios shown, the shaft 126 is driven at a constant speed equal to one half of the sum of the speeds of the engines 10 and 12.

Driven by the constant speed shaft 126 is an electric generator 146 which supplies power, by conductors 148, to the synchronous electric motor 40 employed as a "time keeper" in the compensator speed control 38. Preferably, a flywheel 150 is mounted on the shaft 126.

The generator 146 and/or the flywheel 150 constitute rotary inertia means that supply an inherent temporary torque reaction for the bevel gears 134 and 136 of the differential unit 132, so that a change in speed of one engine, either an increase or a decrease, tends to correspondingly decrease or increase the speed of the other engine. Hence, the constant speed rotary inertia means effects accurate and fast response of the power-pack output shaft 26 to the movements of the speed control handle 60.

In the operation of the power-pack thus far described which, assuming stationary brake reaction discs 108 is the full equivalent of the power-pack disclosed in the aforementioned copending application, the power-pack output shaft 26 turns at a speed equal to one half $$[(Sp+Sd)-(Sp-Sd)]$$

where $Sp$ is the predetermined equal speed of the engines (and pre-set into the compensator speed control 38) and $Sd$ is the equal difference in speed (R. P. M.s) of either engine from $Sp$. Solution of the above formula shows that the shaft 26 turns at a speed $Sd$. To perform work, the faster engine delivers a torque T at a speed of $Sp+Sd$. Because of the differential unit 32, this torque T tends to speed up the slower engine, but the compensator speed control 38 actuates the torque absorber of the slower engine to counteract the torque T and maintain the speed of the slower engine at the desired $Sp-Sd$. Hence, it is apparent that the slower engine and its torque absorber, in providing a reaction torque T at a speed of $Sp-Sd$, absorb horse power equal to $$\frac{T \times (Sp-Sd)}{5,252}$$

In a power-pack of the type thus far described, with stationary brake reaction members, the following conditions obtain:

1. The reaction torque of the slower engine and its torque absorber equals the torque of the faster engine.

2. The output torque of the shaft 26 equals twice the torque of the faster engine, since the input and output torques of the differential 32 must be balanced and the input torques are composed of the faster engine torque and the equal reaction torque of the slower engine and its torque absorber.

3. Efficiency of the power-pack equals $$\frac{\text{power output}}{\text{power input}}$$

or $$\frac{2T\left(\frac{Sf-Ss}{2}\right)}{T \times Sf}$$

where $Ss$ and $Sf$ represent the speed of the slower and the faster engines respectively. Expressed in percentage, this formula reduces to $$100\left(1 - \frac{Ss}{Sf}\right)$$

In considering the efficiency, it will be seen that the efficiency is zero when both engines have the same speed, i. e., the speed of the output shaft 26 is zero, and does not reach 100% until the slower engine is stopped. In this event, the power absorbed in the slower engine and its torque absorber is zero and the necessary torque reaction is then a fixed reaction. It usually is impractical to stop a power unit completely, particularly when such a unit is an internal combustion engine. Therefore, the power-pack thus far described runs over an efficiency range of 0%, at zero speed of the output shaft 26, to approximately 65% at maximum speed of the shaft 26 (accomplished by slowing one engine to its minimum idling speed while speeding up the other a proportionate amount above $Sp$). This efficiency range is shown graphically by the curve A of the chart shown in Figure 2. This chart shows that the efficiency of the power-pack rises from 0% at zero speed of the output shaft to about 65% at maximum speed, when the slower engine has been slowed to its minimum practical speed.

It is the purpose of this invention to improve the power-pack thus far described, i. e., with stationary brake reaction members, to obtain 100% efficiency at maximum practical output R. P. M., i. e. at minimum practical speed of the slower engine.

It can be seen that the loss of efficiency of the power-pack is directly due to the power absorbed in the torque absorber of the slower engine. Such power absorption is directly proportional to the relative speed between the revolving member 106 and the stationary reaction member 108 of the torque absorbers 102 and 104. Hence, it can be seen that if the reaction member 108 of the torque absorbers rotates at a constant speed equal to the minimum practical speed of the engines 10 and 12, the efficiency of the power-pack at maximum practical output speed will be 100%. Such result obtains because there could then be no relative speed between the revolving and the reaction members 106 and 108 of the torque absorbers and, consequently, no power absorption therein.

These desired results can be approached by providing a drive from the constant speed shaft 126 for the reaction members 108 of both torque absorbers 102 and 104 to constitute a regenerative system. Thus, the reaction member 108 of the torque absorber 102 may be driven in the same direction as the rotating member 106 thereof by a gear 152 on the constant speed shaft 126, meshing with an idler 154 that, in turn, meshes with a circumferential series of gear teeth 156 on the reaction member 108. Likewise, the reaction member 108 of the torque absorber 104 is driven in the same direction as the rotating member 106 thereof, by a gear 158 on the constant speed shaft 126, meshing with a circumferential series of gear teeth 160 on the reaction member. The drive ratios $r$ for both reaction members 108 should, of course, be equal, and in the present instance are shown as 2 to 1, i. e. gear 152 is half the diameter of gear 156, and gear 158 is half the diameter of gear 160, that is $r$ equals 2.

Thus, when the torque absorber of the slower engine is absorbing a torque $Tta$, a torque $$\frac{Tta}{r}$$

is transmitted by the gears driving the torque absorber reaction member 108 to the constant speed shaft 126 and thence to the pinion gears 130 of the differential unit 132. Since this unit 132 is a torque balancing device, the torque $$\frac{Tta}{r}$$

is split equally to apply through the gears 140, 142 and 144 a torque $$\frac{Tta}{2r}$$

to shaft 18 and, through the gears 136 and 138, a torque $$\frac{Tta}{2r}$$

to shaft 20. Assuming that engine 12 is the slower of the two, the torque $$\frac{Tta}{2r}$$

applied to the shaft 20 is a component of the torque being absorbed in the torque absorber 104, while the torque $$\frac{Tta}{2r}$$

applied to the shaft 18 adds to the torque of the fast engine 10. Hence, the torque applied by the shaft 18, through gears 14 and 22, to the bevel gear 28 of the differential unit 32 is $$Te \text{ plus } \frac{Tta}{2r}$$

where $Te$ is the torque of the engine 10. Since the differential unit 32 is a torque balancing device, a torque $$Te \text{ plus } \frac{Tta}{2r}$$

is applied therethrough, and through the gears 24 and 16, to the shaft 20. The total torque entering the brake 104 is therefore $$Te \text{ plus } \frac{Tta}{2r} \text{ plus } \frac{Tta}{2r}$$

or $$Te \text{ plus } \frac{Tta}{r}$$

From the above, it will be seen that in a power-pack embodying this invention the following conditions obtain, neglecting torque absorbed by the idling i. e. slower engine:

1. Torque absorbed in a torque absorber equals the torque of the faster engine plus $$\frac{\text{torque absorber torque}}{r}$$

or $$T_{ta} \text{ equals } T_e \text{ plus } \frac{T_{ta}}{r}$$

Solving the equation for $T_{ta}$ shows that $$T_{ta} \text{ equals } T_e\left(\frac{r}{r-1}\right)$$

2. Torque applied to the differential unit 32 by the output shaft of the faster engine equals the torque of the faster engine plus $$\frac{\text{torque absorber torque}}{2r}$$

or $$T_e + \frac{T_{ta}}{2r}$$

or (using the final equation of condition 1)

$$T_e\left(\frac{2r-1}{2r-2}\right)$$

3. Power-pack output torque equals twice the torque applied by the shaft of the faster engine to the differential unit 32, or $$T_e\left(\frac{2r-1}{r-1}\right)$$

4. Efficiency in percent equals $$100 \times \frac{\text{power output}}{\text{power input}}$$

or $$100 \times \frac{T_e\left(\frac{2r-1}{r-1}\right)\left(\frac{S_f - S_s}{2}\right)}{T_e \times S_f}$$

which reduces to:

$$100\left(\frac{2r-1}{2r-2}\right)\left(1 - \frac{S_s}{S_f}\right)$$

Hence, by properly selecting the ratio $r$, the efficiency of a power-pack embodying this invention may be adjusted to equal 100% at any desired output speed, neglecting the unrecoverable torque absorbed in the idling i. e. slower engine (friction horsepower) and various other power losses typical of engine and transmission units. A typical efficiency curve B for the improved power-pack, using $r$ equals 2, is shown in the chart of Figure 2. It will be seen that at maximum practical output speed of the power-pack, its efficiency is 100%, again neglecting the unrecoverable torque absorbed in the idling i. e. slower engine (friction horsepower) and various other power losses typical of engine and transmission units.

It will be realized that various changes may be made in the specific example shown and described for the purpose of disclosing this invention without departing from the principles thereof. Therefore, this invention includes all modifications encompassed within the spirit and scope of the following claims.

I claim:

1. A variable speed and direction power drive comprising: a pair of power units; a differential gear unit having opposite gears and an orbital gear with said opposite gears connected to said power units for drive thereby in opposite directions and for power takeoff from said orbital gear; compensator means associated with said power units for selectively changing their speed equally and oppositely from a predetermined equal speed; a pair of adjustable torque absorbers each driven by one of said power units and both connected to said compensator means for varying the torque absorption of each absorber in accordance with the output of the driving power unit, each said absorber having a rotatable reaction member; and gear means for regeneratively adding at least a part of the reaction torque of each said absorber to the output torque of said orbital gear.

2. The structure defined in claim 1 in which the power units are twin internal combustion engines.

3. The structure defined in claim 1 in which each torque absorber is adjustable by the compensator means for increase of torque absorption, substantially proportional to the decrease of the speed of the driving power unit below its said predetermined speed.

4. The structure defined in claim 1 in which the torque absorption of each absorber is substantially zero at the said predetermined speed of the units.

5. A variable speed and direction power drive comprising: a pair of power units, a differential gear unit having opposite gears and an orbital gear with said opposite gears connected to said power units for drive thereby in opposite directions and for power takeoff from said orbital gear; compensator means associated with said power units for selectively changing their speed equally and oppositely from a predetermined equal speed; a pair of torque absorbers each driven by one of said power units and both connected to said compensator means for varying the torque absorption of each absorber substantially in proportion to the decrease of the speed of the driving power unit below its said predetermined speed, each of said absorbers having a rotatable reaction member; a second differential gear unit having opposite gears and an orbital gear with said second differential opposite gears connected to said power units for drive thereby in the same direction to impart a constant speed to said orbital gear of said second differential unit; and a driving connection between said orbital gear of said second differential gear unit and the rotatable reaction member of each torque absorber.

6. The structure defined in claim 5, including inertia means driven by the orbital gear of the second differential gear unit.

7. The structure defined in claim 5, including an electric generator driven by the orbital gear of the second differential gear unit; and a synchronous electric motor powered by said generator included in the compensator means as a constant speed reference therefor.

8. A structure according to claim 1, provided with means for varying the predetermined equal speed.

9. A structure according to claim 5, provided with means for varying the predetermined equal speed.

PAGE MARSTON SCHMITT.

References Cited in the file of this patent

UNITED STATES PATENTS

| Number | Name | Date |
|---|---|---|
| 695,005 | Sponsel | Mar. 11, 1902 |
| 1,886,975 | Profitlich | Nov. 8, 1932 |
| 2,195,139 | Waseige | Mar. 26, 1940 |
| 2,252,545 | Benz | Aug. 12, 1941 |